United States Patent [19]

Arren et al.

[11] Patent Number: 5,654,374
[45] Date of Patent: Aug. 5, 1997

[54] CURABLE COMPOSITIONS CONTAINING SILYL-FUNCTIONAL ONIUM CURE ACCELERATORS AND METHOD OF CURING USING SAME

[75] Inventors: Dirk H. C. Arren, Borsbeek, Belgium; William D. Coggio, Woodbury; Douglas S. Parker, Afton, both of Minn.

[73] Assignee: Minnesota Mining and Manufacturing Company, St. Paul, Minn.

[21] Appl. No.: 520,129

[22] Filed: Aug. 28, 1995

[51] Int. Cl.[6] .................................................. C08F 8/100
[52] U.S. Cl. .................... 525/326.3; 524/154; 524/186; 524/188; 524/236; 525/326.2
[58] Field of Search .................. 525/326.3, 326.2; 524/186, 188, 236, 154

[56] References Cited

U.S. PATENT DOCUMENTS

| | | | |
|---|---|---|---|
| 3,518,292 | 6/1970 | Frye | 260/448.8 |
| 3,752,787 | 8/1973 | de Brunner | 260/41 B |
| 3,876,654 | 4/1975 | Pattison | 260/30.4 |
| 4,006,176 | 2/1977 | Heckert et al. | 260/448.2 |
| 4,214,060 | 7/1980 | Apotheker et al. | 525/387 |
| 4,233,421 | 11/1980 | Worm | 525/343 |
| 4,259,463 | 3/1981 | Moggi et al. | 525/331 |
| 4,535,184 | 8/1985 | Middleton | 564/102 |
| 4,607,115 | 8/1986 | Riederer et al. | 556/462 |
| 4,882,390 | 11/1989 | Grootaert et al. | 525/326.3 |
| 4,912,171 | 3/1990 | Grootaert et al. | 525/340 |
| 4,927,887 | 5/1990 | Tate et al. | 525/279 |
| 4,975,139 | 12/1990 | Sugimoto | 156/307.1 |
| 4,994,577 | 2/1991 | Hashem et al. | 548/406 |
| 5,001,091 | 3/1991 | Pujari et al. | 501/103 |
| 5,041,480 | 8/1991 | Kawachi et al. | 524/186 |
| 5,051,330 | 9/1991 | Alexandrovich et al. | 430/110 |
| 5,086,123 | 2/1992 | Guenthner et al. | 525/276 |
| 5,187,239 | 2/1993 | Parks et al. | 525/329.3 |
| 5,262,490 | 11/1993 | Kolb et al. | 525/343 |

OTHER PUBLICATIONS

"Fluorocarbon Elastomers," *Encyclopedia of Polymer Science and Engineering*, vol. 7, pp. 256–269, 2nd ed., John Wiley & Sons (1987).

Corbridge, "Phosphonium Salts," *Phosphorus*, pp. 176–179, Elsevier Scientific Publishing Company (1978).

Carey et al., *Advanced Organic Chemistry*, Part B, 3rd ed., pp. 96–97, Plenum Press (1990).

Rauhut et al., "The Free Radical Addition of Phosphines to Unsaturated Compounds", *Journal of Organic Chemistry*, vol. 26, pp. 5138–5145 (1961).

Pellon, "Reversibility in the Reaction of Phosphinyl Radicals with Olefins", *Journal of American Chemistry Society*, vol. 83, pp. 1915–1916 (1961).

Buckler et al., "Reactions of Phosphine with Aliphatic Aldehydes", *Journal of American Chemistry Society*, vol. 83, pp. 168–173 (1961).

Langhans et al., "Synthese Primärer und Sekundärer Phosphane Durch Selektive Alkylierung von $PH_3$ Unter Phasentransferbedingungen", *Z. Naturforsch*, vol. 45b, pp. 203–211 (1990).

Horváth et al., "Facile Catalyst Separation Without Water: Fluorous Biphase Hydroformylation of Olefins" *Science*, vol. 266, pp. 72–75 (1994).

Colvin, "Silanes as Reducing Agents" *Silicon in Organic Synthesis*, pp. 325–336, Krieger Publishing Co. (1985).

Allcock et al., "Synthesis and Reactivity of Cyclotriphosphazenes Bearing Reactive Silane Functionalities: Novel Derivatives via Hydrosilylation Reaction[1]", *Organometallics*, vol. 10, pp. 3819–3825 (1991).

Brullo, "Fluoroelastomer Rubber for Automotive," *Automotive Elastomers & Design* (1985).

Brullo, "Fluoroelastomers Seal Up Automotive Future," *Materials Engineering*, pp. 36–40 (1988).

Product Brochure, "The Reaction of $PH_3$ with Olefins", p. 4, Cytec Industries, West Paterson, NJ, 93–830–1k (Date Unknown).

*Primary Examiner*—Edward J. Cain
*Attorney, Agent, or Firm*—Gary L. Griswold; Walter N. Kirn; John A. Burtis

[57] ABSTRACT

A curable composition that includes (a) at least one curable polymer comprising interpolymerized units derived from vinylidene fluoride; and (b) at least one cure accelerator comprising a silyl-functional onium salt, and a method for curing such compositions.

30 Claims, No Drawings

CURABLE COMPOSITIONS CONTAINING SILYL-FUNCTIONAL ONIUM CURE ACCELERATORS AND METHOD OF CURING USING SAME

BACKGROUND

Fluoropolymers containing vinylidene fluoride units (e.g., copolymers of vinylidene fluoride and ethylenically unsaturated monomers such as hexafluoropropene) have particular utility in high temperature applications, including seals, gaskets, and linings, as described, for example, in Brullo, R. A., "Fluoroelastomer Rubber for Automotive Applications," *Automotive Elastomer & Design*, June 1985, "Fluoroelastomer Seal Up Automotive Future," *Materials Engineering*, October 1988, and "Fluorocarbon Elastomers," *Encyclopedia of Polymer Science and Engineering*, vol. 7, pp. 257 et seq. (2d ed., John Wiley & Sons, 1987). One reason is that such fluoropolymers, when cured, have good resistance to damage by heat, solvents, corrosive chemicals, and steam. However, the curing process is generally very slow, necessitating the use of a cure accelerator. A variety of organo-onium compounds have been proposed for this purpose.

In addition, during the manufacturing process (particularly where injection molding is used) the cured polymers generally adhere to the surface of the mold. As a result, a shaped article prepared from the fluoropolymer is frequently torn or damaged when removed from the mold. Also, the incorporation of a mold release agent into the polymer can have serious adverse effects on the physical properties of the cured composition (e.g., Mooney Scorch, shrinkage, and compression set) which can limit the successful commercial use of the cured composition. Deposits of polymer on the mold cavity surface ("mold fouling") and poor release of the shaped, cured article from the mold are major reasons for defects, resulting in rejection of the article (which then adds to the expense of manufacturing such articles).

One possible solution to the mold release problem is proposed in Kolb et al., U.S. Pat. No. 5,262,490 (which is hereby incorporated by references). Kolb describes compositions containing a phosphonium or ammonium salt, a sulfonium compound, and (optionally) a polyhydroxy compound that are designed to perform the dual functions of accelerating fluoropolymer cure and providing mold release properties.

SUMMARY

In general, the invention features a new class of curable compositions that include (a) at least one curable polymer comprising interpolymerized units derived from vinylidene fluoride; and (b) at least one cure accelerator comprising a silyl-functional opium salt.

In preferred embodiments, the cure accelerator has the formula

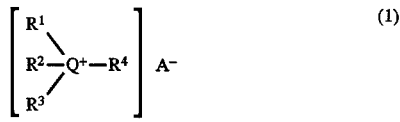

where Q is an onium ion; $A^-$ is a counterion; and $R^1$, $R^2$, $R^3$, and $R^4$, independently, are monovalent substituents in which at least one of the $R^1$, $R^2$, $R^3$, and $R^4$ groups comprises a $C_1-C_6$ alkyl group (which may be a straight chain or branched, e.g., a methyl group) and at least one of the $R^1$, $R^2$, $R^3$, and $R^4$ groups comprises a silyl group, with the proviso that when Q is a sulfonium ion, there is no $R^4$ group.

Examples of preferred silyl groups include those having the formula $-(CH_2)_n-SiR^5R^6-(OSiR^7R^8)_y-Z$ or $-(CH_2)_n-Si-(OSiR^{10}_3)_3$ or

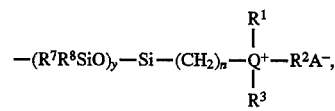

where Z is $-OSiR^9_3$ and each $R^5$, $R^6$, $R^7$, $R^8$, $R^9$, and $R^{10}$, independently, is a $C_1-C_6$ alkyl group (which may be a straight chain or branched, e.g., a methyl group); n is 2–4; and y is 0–4.

Preferably, at least one of the $R^1$, $R^2$, $R^3$, and $R^4$ groups is an n-butyl, iso-butyl, aryl (e.g., phenyl), or alkaryl (e.g., benzyl) group, or combination thereof. Preferred onium ions include phosphonium, ammonium, and sulfonium ion, as well as combinations thereof, with phosphonium ions being particularly preferred.

One example of a preferred composition features a cure accelerator having the formula

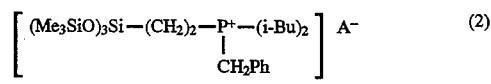

A second example of a preferred composition features a cure accelerator having the formula

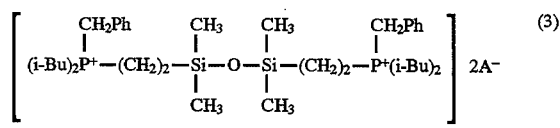

A third example of a preferred composition features a cure accelerator having the formula

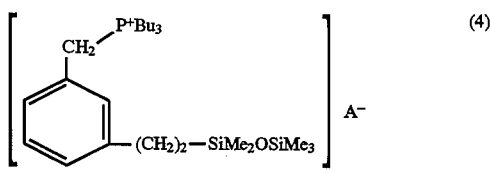

A fourth example of a preferred composition features a cure accelerator having the formula

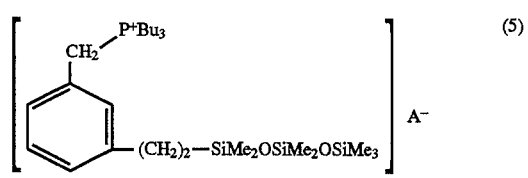

A fifth example of a preferred composition features a cure accelerator having the formula

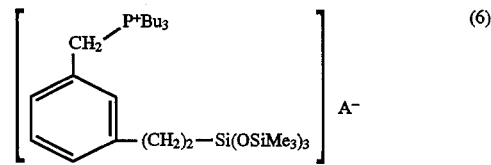

A sixth example of a preferred composition features a cure accelerator having the formula

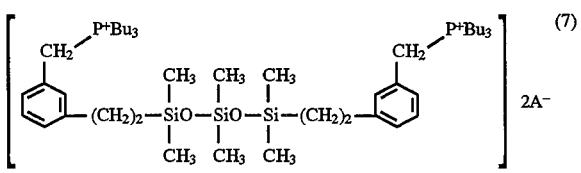

(7)

A seventh example of a preferred composition features a cure accelerator having the formula $$[(Me_3SiOSiMe_2(CH_2)_3)_3N^+Me]A^- \quad (8)$$

An eighth example of a preferred composition features a cure accelerator having the formula

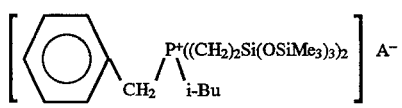

(9)

The invention also features a method of curing a polymer comprising vinylidene fluoride units using the above-described cure accelerators.

As used herein:

A "silyl group" is a group containing a silicon atom bonded to three organic substituents.

A "silyl-functional onium salt" is an onium salt in which at least one of the substituents bonded to the onium ion comprises a silyl group.

"Me" refers to a methyl group.

"Ph" refers to a phenyl group.

"Bu" refers to a butyl group, while "i-Bu" refers to an isobutyl group.

The invention provides curable compositions in which cure time is decreased by means of a silyl-functional onium cure accelerator. In some cases, the silyl-functional onium cure accelerator itself may provide good mold release properties, thereby dispensing with the need for separate mold release agents. The resulting cured articles exhibit good physical properties.

Other features and advantages of the invention will be apparent from the following description of the preferred embodiments thereof, and from the claims.

DESCRIPTION OF THE PREFERRED EMBODIMENTS

Curable vinylidene fluoride-containing fluoropolymer compositions according to the invention contain a silyl-functional onium salt as a cure accelerator. Examples of preferred accelerators have the structures set forth in the Summary of the Invention, above, in which the counterion $A^-$ may be an organic or inorganic anion, e.g., halide, thiosulfate, formate, cyanate, thiocyanate, tetraphenylborate, perchlorate, nitrate, tetrafluoroborate, hexafluorophosphate, oxalate, stearate, haloacetate, para-toluenesulphonate, $ZnCl_4^{2-}$, $CdCl_4^{2-}$, $NiBr_4^{2-}$, $HgI_3^-$, sulfate, acetate, phosphate, phosphonate, hydroxide, alkoxide, phenoxide, trifluoromethane sulfonate, benzene sulfonate, hexachlorophosphate, hexachlorostannate, hexafluoroarsenate, hexafluoroantimonate, 2-mercaptobenzothiazolate, perfluoroalkanesulfonamido anion, bisphenoxide, or phenate. In cases where the counterion has a negative charge greater than one, a single counterion can be used for more than one onium compound.

The $R^1$–$R^{10}$ groups, independently, are preferably selected from the group of radicals consisting of alkyl, aryl, and alkenyl radicals, or combinations thereof. The R groups can be unsubstituted or substituted with, e.g., chlorine, fluorine, bromine, cyano, —OR', and —COOR' moieties where R' is selected from the group of radicals consisting of $C_1$–$C_{20}$ alkyl, aryl, aralkyl, and alkenyl radicals. In addition, any pair of R groups can be connected with each other and the onium ion to form a heterocyclic ring.

The silyl-functional onium salts are generally prepared by one of two methods. The first method involves reacting, e.g., a phosphine, amine, or sulfide with a silylated alkylating agent (e.g., a silylated alkyl halide, aryl halide, or acyl halide), resulting in the expansion of the valence of the electron donating phosphorous, nitrogen, or sulfur atom and a positive charge on the organo-onium. Such reactions are well-known in the art. A general description of such reactions can be found in (a) Emmsley, J., "The Chemistry of Phosphorus," John Wiley and Sons, Inc., 1976 and (b) Carey, F. A. and Sundberg, R. J., "Advanced Organic Chemistry," Part B, 3rd Ed., Plenum Press, 1990.

The second method involves preparing a silyl-containing phosphine, amine, or sulfide, followed by reaction with an alkyl or aryl halide such as benzyl chloride or allyl bromide. The silyl-containing compounds, in turn, are prepared via well-known reactions. For example, in the case of phosphines, the silyl-containing compounds are prepared via reaction of a phosphine with a vinyl silane as described, e.g., in Rahut et al., *J. Org. Chem.*, 1961, 26, 5138; Pellon, *J. Am. Chem. Soc..*, 1961, 83, 168; Buckler et al., *J. Am. Chem. Soc..*, 1961, 83, 168; Langhans et al., *Z. Naturforsch*, 1990, 45b, 203; and Horvath et al., *Science*, 1994, 266, 72. In the case of amines, silylation involves reaction between a silane (e.g., pentamethyl disiloxane) and a vinyl or allyl amine (e.g., allyl amine) as described, e.g., in Colvin, E. W., "Silicon in Organic Synthesis," Ch. 21, Krieger Publishing Co., 1985 and Allcock et al., *Organometallics*, 10, 3819 (1991).

Examples of curable vinylidene fluoride-containing polymers are described in the aforementioned Kolb patent; Worm, U.S. Pat. No. 4,233,421; and Grootaert et al., U.S. Pat. No. 4,882,390, all of which are hereby incorporated by reference. Specific examples include copolymers and terpolymers of vinylidene fluoride with terminally unsaturated monoolefins typically used for the preparation of fluorine-containing polymers such as hexafluoropropene, chlorotrifluoroethylene, 2-chloropentafluoropropene, perfluoroalkyl vinyl ethers (e.g., $CF_3OCF=CF_2$ or $CF_3CF_2OCF=CF_2$), tetrafluoroethylene, 1-hydropentafluoropropene, 2-hydropentafluoropropene, dichlorodifluoroethylene, trifluoroethylene, 1,1-dichlorofluoroethylene, vinyl fluoride, and mixtures thereof. Fluorine-free terminally unsaturated monoolefin monomers, e.g., ethylene or propylene, may also be used as co-monomers.

Fillers are often added to the polymers discussed above to improve the physical properties of the cured composition or vulcanizate. When a filler is employed, it is added to the vulcanization recipe in amounts of up to about 100 parts per hundred parts by weight of polymer, preferably between about 1 and 50 parts per hundred parts by weight of the polymer. Examples of fillers which may be used are reinforcing thermal grade carbon blacks or non-black pigments of relatively low reinforcement characteristics such as clays, barytes, etc. In some instances, it may also be desirable to add one or more diorgano sulfur oxide compounds, and other conventional adjuvants or ingredients, e.g., retarding agents and processing aids to the curable composition.

The curable composition preferably contains a crosslinking agent as well. Such agents are well known and are described in the art, e.g., in the aforementioned Kolb and Worm patents, and in U.S. Pat. No. 4,259,463 (Moggi et at.), U.S. Pat. No. 3,876,654 (Pattison), and U.S. Pat. No. 5,384,374 (Guerra et al.), all of which are hereby incorporated by reference, and can include aromatic polyhydroxy compounds, aliphatic polyhydroxy compounds, and derivatives thereof. Blends may be used as well. Preferred polyhydroxy compounds-are aromatic polyhydroxy compounds such as isopropylidene-bis(4-hydroxy-benzene) ("bisphenol A") and hexafluoroisopropylidenebis(4-hydroxybenzene) ("bisphenol AF").

Fluoroaliphatic sulfonamides can also be added, including those of the formula $R_fSO_2NHR''$, where $R''$ is a hydrogen atom or alkyl radical having, for example, from 1 to 20 carbon atoms, preferably from 1 to 12 carbon atoms, $R_f$ is a fluoroaliphatic radical such as a perfluoroalkyl, e.g., $C_nF_{2n+1}$ where n is 1 to 20, or perfluorocycloalkyl, e.g., $C_nF_{2n-1}$ where n is 3 to 20, such compounds being described, for example, in U.S. Pat. No. 5,086,123 (Guenther et al.). The fluoroaliphatic sulfonamide is preferably a perfluoroalkylsulfonamide and may be added as a separate compound, or as the anion of the organo-onium compound.

The silyl onium cure accelerators and crosslinking agent can be added to the uncured polymer gum in the form of finely divided solids or as solutions in alcohol or ketone solvents by mixing the materials into the polymer gum stock. Thus mixed, the gum stock can generally be stored at room temperature for extended periods, e.g., up to two years or more.

Prior to curing, an acid acceptor is mixed into the gum stock, after which storage life of the stock is more limited. Acid acceptors can be inorganic or organic. Organic acceptors include epoxies, sodium stearate, and magnesium oxalate. Examples of inorganic acceptors include magnesium oxide, lead oxide, calcium oxide, calcium hydroxide, dibasic lead phosphite, zinc oxide, barium carbonate, strontium hydroxide, calcium carbonate, etc. The preferred acid acceptors are magnesium oxide and calcium hydroxide. The acid acceptors can be used singly or in combination, and preferably are used in amounts ranging from about 2 to 25 parts per 100 parts by weight of the polymer. All of the components of the curing system may be admixed prior to their incorporation into the polymer gum without departing from the scope of the invention.

The relative amounts of the crosslinking agent and silyl onium salt are present in the composition in such amounts as to provide the desired cure of the composition when mixed with acid acceptor. Representative proportions of components of the curing system are as follows:

Acid acceptor: 0.5 to 40 phr
Silyl onium: 0.2 to 5 mmhr
Crosslinker: 0.3 to 10 mmhr All amounts are given in parts per 100 parts polymer (abbreviated "phr") or in millimoles per hundred grams polymer (abbreviated "mmhr"). These proportions are general ranges. The particular amount for each particular cure time and temperature will be apparent to one of ordinary skill in the art.

In accordance with this invention, the desired amount of acid acceptor, silyl onium salt, crosslinking agent, diorgano sulfur oxide compounds (if any), and other conventional adjuvants or ingredients are added to the unvulcanized polymer (i.e. gum stock) and intimately admixed therewith or compounded by employing any of the usual rubber mixing devices such as Banbury mixers, roll mills, or any other convenient mixing device. For best results the temperature of the composition during mixing should not rise above about 120° C. During mixing it is necessary to distribute the components and adjuvants uniformly throughout the curable polymer.

The curing process typically comprises molding the resulting composition under pressure at a temperature ranging from about 95° C. to about 230° C., followed by curing. The composition of this invention is particularly useful for injection molding. The molded product is then usually post cured (e.g., oven cured) at a temperature between about 150° C. and about 315° C., usually at about 232° C., for a period of from about 2 hours to 50 hours or more depending on the cross-sectional thickness of the sample.

The invention will now be further described by way of the following examples.

EXAMPLES

The following examples illustrate curable compositions of this invention and advantages thereof, such as acceleration of the cure of the curable compositions and the added benefit of good mold release properties.

Cure and rheological properties of several curable compositions were evaluated using the following test methods:

Cure Rheology Tests were run on uncured, compounded admixtures using the Moving Die Rheometer (MDR) Model 2000E Monsanto at 177° C. on an 8.0 g quantity of the admixture in accordance with ASTM D 5289–93a for a rotorless rheometer, no preheat, an oscillator frequency of 100 cpm and a 0.5° arc. Minimum torque ($M_L$), maximum torque ($M_H$), and delta torque ($\Delta T$), the difference between $M_H$ and $M_L$, were reported. Also reported were $t_s2$ (the time to a 2 unit rise in torque from $M_L$) $t_s50$ (the time to increase torque above $M_L$ by 50% of delta torque), and t'90 (the time to increase torque above $M_L$ by 90% of delta torque), all of which were reported in minutes.

Press-Cure data, unless otherwise noted, was obtained from 20×20×0.2 cm sheets prepared by pressing a sample of the curable compositions at about 6.9 MPa for 12 min. at 1770° C.

Post-Cure data was obtained from sheets prepared as described above which were then further treated by heating the sheets in a circulating air oven maintained at about 232° C. for 16 hours.

Tensile Strength at Break, Elongation at Break and Stress at 100% Elongation were determined using a Syntech™ mechanical tester with a 200 lbs (88.9 kg) load cell in accordance with ASTM D 412-92$^{e1}$. Test specimen strips 5"×0.5"0.125" (127 mm×127 mm×3.2 mm) were cut from the press- or post-cured sheets. A 2" (50.8 mm) gage section was used to follow the cross head displacement. All tests were run at a constant cross head displacement rate of 20 in./minute (508 mm/min.) in triplicate. The values reported were averages of the three tests. Stress at 100% Elongation, Elongation at Break, and Tensile Strength at Break were reported in units of Mega Pascals (MPa), %, and MPa respectively.

Evaluations of injection molding performance, i.e. mold release, were performed using a DESMA 966.053 ZO lab injection molding machine available from Kloeckner Ferromatic Desma Gmbh of Germany. The machine is further described as having 500 kN mold closing force, 27 kW total power installed, 55 mm injection piston diameter, 120 mm maximum piston stroke, 200 MPa maximum injection pressure, 400 mm/sec. maximum injection speed and a plastication unit with 30 mm screw diameter and screw RPM of 30–220. The mold used to make O-rings was a 4 cavity mold with O-ring internal diameter of 48 mm, O-ring cross-section of 2.90 mm, a runner length of 13 mm, sprue base diameter of 5.2 mm, sprue length of 29 mm, and each cavity had a vacuum canal. The mold steel was STAVAX ESR with a surface finish EDM.

The mold was conditioned before each experiment (change of formulation) by blasting the mold surface with 50–150 micron glass beads under 0.2 MPa pressure for 10 minutes. The mold was then conditioned for 30 minutes in a water-based caustic solution at 80° C. and then ultrasonically cleaned in the solution for 10 minutes. After cleaning, the mold was rinsed with deionized water, dried and stored overnight before use. Multiple molding cycles were made of each formulation.

The steady state O-ring injection molding conditions were 190° C. mold temperature, 95° C. injection barrel temperature, 60° C. screw barrel temperature, injection speed 60% of maximum, after-injection pressure of 5.5 MPa for 2 seconds, screw RPM 35% of maximum, backpressure of 0.5 MPa, plastication delay of 2 seconds after end holding time and a vacuum time of 2.5 seconds. The holding time and heating time were both dependent upon vulcanization speed and were adjusted to obtain cured O-rings. The injection volume was adjusted to give similar flash to the parts molded.

Experimental Preparation of Alkylsilyl Phosphines:

The alkylsilyl phosphines used in the preparation of quaternary phosphonium salts used in the present invention were prepared via a free radical hydrophosphorylation reaction, as described below. Several halides and an amine used in the salt preparations were also synthesized as described below. The reactions were carried out at room temperature and pressures unless otherwise noted. Structural characterization data were obtained by NMR and IR spectroscopic techniques.

Phosphine A:

2-((tris-trimethylsiloxy)silyl)ethyl di-isobutylphosphine (Phosphine A) was prepared by the interaction between vinyl tris(trimethylsiloxy) silane and di-isobutylphosphine (DIBP) in toluene, as follows.

A 1 L, four-neck flask, equipped with an overhead stirrer, a condenser, nitrogen purge, thermometer and rubber septum, was charged with 120 g (0.82 mol) of di-isobutyl phosphine, available from Cytec Industries, Inc. as a 70% solution in toluene. The flask assembly was placed on an adjustable lab jack so that either external heating or cooling of the reaction flask could be done. Additional toluene was added to dilute the DIBP solution to about 50% solids. The reaction vessel was purged with nitrogen for fifteen minutes and a positive stream of nitrogen was maintained throughout the reaction to minimize the oxidation of the DIBP.

In a second flask, 270 g (0.84 mol) of vinyl tris (trimethylsiloxy)silane (available from Hüls America Inc.) was mixed with about 100 ml of toluene and 1.3 g (8.5 mmol) of azobisisobutyronitrile (AIBN), available from Aldrich Chemical Company, Inc. The toluene solution of DIBP in the four-neck flask was warmed to about 80° C. and the vinyl silane solution from the second flask was added via a syringe pump to the warm DIBP at about 2.5 mL/min. After about 20 min., a noticeable exotherm was detected, and the rate of silane addition and external heating were adjusted so that a temperature of 80° to 95° C. could be maintained.

After complete addition of the vinyl silane solution, the reaction mixture temperature was controlled at about 85° C. for an additional 2 hrs to ensure complete consumption of the DIBP had occurred. When the reaction was complete as determined by $^{31}$P NMR spectroscopy, ($\delta$=−40 ppm up field from external $H_3PO_4$), the toluene solvent was removed under reduced pressure. The desired product 2-((tris trimethylsiloxy)silyl) ethyl di-isobutylphosphine was obtained in yields of 70% to 80%. $^1$H, $^{31}$P NMR spectroscopy confirmed the structure of the desired product.

Phosphine B:

1,3-(2-ethyl di-isobutylphosphine) tetramethyldisiloxane (Phosphine B) was prepared in a manner similar to Phosphine A, except 78 g (0.42 mol) of 1,3-divinyl tetramethyl disiloxane, available from Hüls America Inc., was used instead of the 270 g (0.84 mol) of vinyl tris(trimethylsiloxy) silane.

Halide C:

3-(2-pentamethyldisiloxy ethyl) benzylchloride (Halide C) was prepared in a 500 ml reaction vessel equipped with a magnetic stir bar, reflux condenser and a nitrogen inlet by charging 200 mL of tetrahydrofuran (THF), 40.0 g (0.27 mol) pentamethyldisiloxane, available from Hüls-America, 43.5 g (0.289 mol) 3-vinylbenzylchloride (VBC), available from Aldrich Chemical Company, Inc., and 0.2 g (1% w/w) of a platinum hydrosilylation catalyst (1,3-divinyltetramethyl disiloxane platinum (DVDS-Pt), available from Hüls-America) to the vessel. The progress of the reaction was monitored by IR spectroscopy to follow disappearance of the Si—H stretch at 2100 cm$^{-1}$. After 12 hrs at 25° C., the reaction was found to be complete by IR analysis. The THF solvent was removed by rotoevaporation. The desired product was isolated by distillation, b.p. 110°–115° C. at 0.15 mmHg and 65.23 g (78% yield) 74% $\alpha$ isomer, 26% $\beta$ isomer was collected.

Halide D:

3-(2-heptamethyltrisiloxy ethyl) benzylchloride (Halide D) was prepared in a manner similar to Halide C, except 20.3 g (0.13 mol) of VBC and 28.8 g (0.13 mol) heptamethyl trisiloxane (available from Hüls-America) were used instead of the pentamethyldisiloxane. After 12 hrs at 25° C., the reaction was found to be complete by IR analysis. The THF solvent was removed by rotoevaporation to produce 48.2 g of a light brown crude product. The product was purified by distillation at 115°–125° C. at 0.1 mm Hg. The yield was 40.5 g (83% yield). Analysis by $^1$H and $^{13}$C NMR spectroscopy confirmed the formation of the desired product. It was found to contain 66% $\alpha$ isomer and 34% $\beta$ isomer addition product.

Halide E:

3-(2-tris(trimethylsiloxy)silylethyl) benzylchloride (Halide E) was prepared in a manner similar to Halide C, except that 30.5 g (0.103 mol) tris-trimethylsiloxy silane, available from Hüls America Inc., was reacted with 18.0 g (0.11 mol) VBC. The desired product was isolated by distillation, b.p. >185° C. at 0.15 mmHg and 32.5 g of >98% $\beta$ isomer, <2% 62 isomer was collected.

Halide F:

1,5-bis(2-ethyl-3-benzylchloro)hexamethyltrisiloxane (Halide F) was prepared in a manner similar to Halide C, except that the reaction was done at 100% solids using 25.0 g (0.12 mol) of 1,5-hexamethyl trisiloxane, available from H üls America Inc., and 38.9 g (0.252 mol) VBC. The yield was 34.79 g, isolated by distillation, b.p. 195°–210° C. at 0.1 mmHg. In addition to NMR analysis, C,H,N analysis confirmed the structure of the desired product. Analysis for $C_{24}H_{38}Cl_2O_2Si_3$, Calc'd: C, 56.08%; H, 7.47%; N, 0% Found: C, 56.1%; H, 7.3%; N, <0.1%.

Amine G:

Tris-N,N,N-(3-propyl pentamethyl disiloxane)amine (Amine G) was prepared under an atmosphere of nitrogen in a 250-ml, 3-neck, round-bottomed flask, equipped with a magnetic stir bar, a reflux condenser and an addition funnel. This flask was charged with 15.9 g (115.6 mmol) of triallylamine, $(CH_2=CHCH_2)_3N$, available from Aldrich Chemical Company, Inc., and 50 ml of heptane. About 1 to 2 wt % of DVDS-Pt was added to the mixture and the mixture was heated to 65°–70° C. The addition funnel was charged with a solution of 50.0 g (340 mmol) $Me_3SiOSiMe_2H$, available from Hüls America Inc., in 50 ml of heptane, which was then added to the reaction mixture dropwise with stirring. After the addition was complete, the reaction mixture was observed to be brownish in color. An IR spectrum showed the disappearance of the Si—H band at 2160 $cm^{-1}$. After an additional 3 hrs. of stirring, some colloidal clay was added to the mixture to adsorb the catalyst. The mixture was then allowed to cool down to room temperature and was stirred overnight. The reaction mixture was filtered, and the heptane was separated on a rotary evaporator. The product was Kugelrhor distilled at 120°–160° C. at 1.7 mm Hg yielding a yellowish, slightly viscous fluid (56.5 g, 86%). The $^1H$, $^{13}C$ and $^{29}Si$ NMR spectra were consistent with the structure of the desired product.

Onium H

Onium H was prepared in a one-neck, airless flask by charging 30 g (0.064 mol) of 2-((tris trimethylsiloxy)silyl) ethyl di-isobutylphosphine (Phosphine A) and sufficient isopropanol to form a 50% solids solution. A positive flow of nitrogen was maintained through out the reaction. Then, 8.2 g (0.065 mol) of benzyl chloride, available from Aldrich chemical company, Inc., was added to the phosphine solution. The reaction mixture was warmed to about 45° C. and allowed to react for 16 hrs. The progress of the quaternization reaction was monitored by $^{31}P$ NMR spectroscopy. The reaction was considered complete when the 31P NMR spectrum of the reaction mixture consisted of a major singlet at +30 ppm.

The reaction product was isolated by solvent removal under reduced pressure. Care was taken to avoid heating the product above 65° C. The product was isolated as a waxy, white solid. Characterization of the product by $^{31}P$, $^1H$ NMR spectroscopy confirmed the formation of the desired compound. The silyl phosphonium product contained a small percentage of phosphine oxide. No attempt was made to remove this by-product from the desired phosphonium product.

Onium I:

Onium I was prepared in a manner similar to Onium H except Phosphine B was used instead of Phosphine A.

Oniums J–M:

Onium J was prepared in a 500 ml round bottom flask by charging 15.0 g (0.05 mol) of 3-(2-pentamethyl disiloxy ethyl) benzylchloride (Halide C) and 150 g of 2-propanol. After the solids were dissolved, 11.0 g, (0.05 mol) of tri-n-butylphosphine, available from Aldrich Chemical Company, Inc., was added to this solution. The reaction temperature was kept to less than 50° C. The progress of the reaction was monitored by $^{31}P$ NMR spectroscopy. After 12 hrs, the phosphine was quantitatively converted to the phosphonium, ($^{31}P$ NMR spectrum consisted of a singlet at $\delta=+30$ ppm). The alkylsilylphosphonium was isolated by solvent removal under reduced pressure at 50° C. The product, 3-(2-pentamethyldisiloxy ethyl) tributyl benzyl phosphonium chloride, was isolated as a white, waxy solid.

Oniums K, L, and M were prepared in a manner similar to Onium J except Halides D, E, and F, respectively, were used instead of Halide C. In all cases the alkylsilyl phosphoniums were isolated as low melting, waxy solids. $^1H$ and $^{31}P$ NMR spectroscopy were utilized to confirm the structure and purity of the final product.

Onium N:

N,N,N-tris(3-propyl pentamethyldisiloxy)-N-methyl ammonium iodide (Onium N) was prepared in a 500-ml 2-necked round-bottomed flask equipped with a magnetic stir bar and fitted with an addition funnel. The flask was charged with 29.3 g (207.2 mmol) $CH_3I$, available from Aldrich Chemical Company, Inc., and 170 ml of acetone. The reaction flask was cooled in an ice/water bath to about 10°–20° C. Note: The product of this reaction is sensitive to temperatures above 50° C. so the temperature of the reaction mixture was kept below 50° C. through the workup of the product. The addition funnel was charged with a solution of 30.0 g (51.8 mmol) of $(Me_3SiOSiMe_2(CH_2)_3)_3N$, prepared above as Amine G, in 100 ml of acetone. This solution was added very slowly dropwise to the reaction mixture with stirring overnight. The acetone and excess $CH_3I$ were removed under reduced atmosphere yielding 35.8 g of a brownish red viscous material. The $^1H$, $^{13}C$ and $^{29}Si$ NMR spectra were consistent with the structure of the desired product (76% active). The major side product of this reaction was the formation of $(Me_3SiOSiMe_2(CH_2)_3)_2NMe_2I$—.

Examples 1–9:

The following examples illustrate the use of organo-onium vulcanization accelerators in the curable compositions of the invention. The ingredients used in each composition were compounded on a two roll mill using standard methods. The organo-onium vulcanization accelerators were prepared as described above.

Example 1

In Example 1, a curable composition of the invention was prepared on a two-roll mill by mixing a master batch of 1000 g of a fluorine-containing copolymer of vinylidene fluoride (60 wt %) and hexafluoropropylene (40 wt %), available from 3M Co. as Fluorel™Fluoroelastomer FC-2230, 60 g of $Ca(OH)_2$, 30 g of MgO, and 40 g of Viton™Curative #30, available from E. I. DuPont de Nemours and Co.

A 113 g sample of this master batch was further mixed on a two-roll mill with a 50% solids solution in methanol of 1.7 mmol of Onium H and 30 g of MT-N990 carbon black. The cure of the resulting mixture was analyzed on an 8.0 g sample of the mixture using a Monsanto moving die rheometer (MDR) at 177° C. A press cured sheet was prepared by pressing at 177° C. and 6.9 MPa for 12 min. The press-cured sheet easily demolded from the mold without the use of forced air. A sample of the press-cured sheet was post-cured in air at about 232° C. for 16 hr. Physical property testing was performed on press-cured and post-cured sheets. The final formulation of the compounded gum was such that the sample contained the components and amounts as shown in Table 1.

TABLE 1

| | |
|---|---|
| Fluoroelastomer | 100 phr |
| Viton ™ Curative #30[1] | 4 phr |
| Onium H | 1.7 mmhr |
| $Ca(OH)_2$ | 6 phr |
| MgO | 3 phr |
| Thermax ™ -N990 carbon black | 30 phr |

[1]Contains 50% wt active bisphenol AF, 6 mmol.

Example 2–6

In Examples 2–6, samples of curable compositions according to the invention were prepared and evaluated in a manner similar to Example 1 using 113 g samples of the master batch prepared in Example 1 except the alkylsilyl oniums used were as shown in Table 2.

TABLE 2

| Example | Alkylsilyl onium |
|---|---|
| 2 | Onium I |
| 3 | Onium J |
| 4 | Onium K |
| 5 | Onium L |
| 6 | Onium M |

Comparative Example C1

In Comparative Example C1, a sample of a curable composition was prepared as in Example 1 except the alkylsilyl onium was replaced by 0.5 g (1.30 mmol) of triphenyl benzylphosphonium chloride, available from Aldrich Chemical Company, Inc.

Onium O

Onium O, an alkylsilyl ammonium cure accelerator, was prepared in a 10 ml flask by reacting 0.44 g (1.3 mmol) of bisphenol-AF, with 0.28 g (1.3 mmol) of sodium methoxide (in a 25 wt % solution in methanol), both available from Aldrich Chemical Company, Inc. Next, 0.94 g (1.3 mmol) of the alkylsilyl methyl ammonium iodide prepared as Onium N was added, and the resulting mixture used directly without further purification to prepare a curable composition as described in Example 7.

Example 7

A curable composition of the invention was prepared in a manner similar to Example 1 except 1.3 mmol of Onium O (prepared as described above) was substituted for the 1.7 mmol of Onium H.

The cure and rheological properties obtained are listed in Table 3. The torque values are reported in deci Newton metres (dN.m)

TABLE 3

| Example | Torque $M_L$ (dN.m) | $M_H$ (dN.m) | ΔT (dN.m) | $t_s2$ (min) | t'50 (min) | t'90 (min) |
|---|---|---|---|---|---|---|
| C1 | 0.97 | 27.12 | 26.15 | 1.30 | 1.58 | 2.29 |
| 1 | 1.03 | 20.57 | 19.55 | 1.08 | 1.67 | 2.42 |
| 2 | 1.19 | 29.38 | 28.19 | 1.91 | 2.40 | 3.47 |
| 3 | 0.97 | 30.85 | 29.89 | 1.22 | 1.5 | 2.29 |
| 4 | 1.05 | 31.30 | 30.30 | 1.47 | 1.83 | 2.79 |
| 5 | 1.02 | 32.77 | 31.79 | 1.37 | 1.75 | 2.73 |
| 6 | 1.19 | 24.07 | 22.93 | 1.67 | 2.13 | 3.43 |
| 7 | 0.86 | 24.07 | 23.18 | 5.49 | 9.84 | 25.0 |

The results in Table 3 show that all compositions of the invention will result in a cured fluoroelastomer article.

Physical properties were measured on press-cured sheets (177° C., 12 minutes) and post-cured sheets (232° C., 16 hrs). The results are listed below in Tables 4 and 5.

TABLE 4

Press-Cured Sheet Mechanical Property Data

| Example | Stress at 100% Elong. (MPa) | Elongation at Break (%) | Tensile Strength (MPa) |
|---|---|---|---|
| C1 | 4.7 | 268 | 10.7 |
| 1 | 3.9 | 292 | 8.8 |
| 2 | 4.9 | 246 | 9.8 |
| 3 | 5.0 | 239 | 10.4 |
| 4 | 4.9 | 226 | 9.7 |
| 5 | 4.7 | 235 | 9.3 |
| 6 | 3.8 | 316 | 9.9 |
| 7 | 3.5 | 237 | 7.0 |

The results in Table 4 show that the curable compositions of this invention provide cured articles with acceptable initial cure properties.

TABLE 5

Post-Cure Sheet Mechanical Property Data

| Example | Stress at 100% Elong. (MPa) | Elongation at Break (%) | Tensile Strength (MPa) |
|---|---|---|---|
| C1 | 5.8 | 218 | 13.3 |
| 1 | 5.7 | 219 | 13.5 |
| 2 | 6.9 | 191 | 13.0 |
| 3 | 6.9 | 190 | 13.5 |
| 4 | 6.6 | 194 | 12.6 |
| 5 | 6.6 | 204 | 13.8 |
| 6 | 5.1 | 237 | 12.6 |
| 7 | 6.6 | 191 | 10.4 |

The results in Table 5 show the curable compositions of this invention provide cured articles with acceptable post cure properties.

Compression set data were obtained using ASTM method D-395-89. O-rings were press cured for 12 min. at 177° C. and post cured for 16 hrs at 232° C. O-rings were compressed 25% for 70 hrs at 200° C. Data (shown in Table 6) are reported as percent of the compression remaining after the tests.

TABLE 6

| Example # | Comp set (%) |
|---|---|
| C1 | 18.2 |
| 1 | 29.3 |
| 2 | 35.1 |
| 3 | 24.0 |
| 4 | 25.0 |
| 5 | 26.4 |
| 6 | 24.0 |
| 7 | 29.0 |

The results in Table 6 show the curable compositions of this invention provide cured articles with acceptable compression set properties.

Example 8 and Comparative Example C2

A sample was prepared according to the procedure set forth in Example 1 except that 0.75 phr carnauba wax (available from Aldrich Chemical Co.) was added to the formulation as well.

Comparative Example C2 was prepared according to the procedure set forth in Example C1 except that 0.75 phr carnauba wax (available from Aldrich Chemical Co.) was added to the formulation as well.

Injection molding evaluations were performed as described above and evaluated with the following rating system ranging from a rating of 0 (worst release) to a rating of 8 (best release) which is described below. The results of the evaluation are presented in Table 7.

A release rating of 0 was given:

When no parts could be removed from the mold by any means without tearing them and this was observed for each molding cycle. The molded parts may or may not have torn when the mold was opened. Everything including runners and flash stuck strongly to the mold surface and was difficult to remove. Rubbing with copper wool or similar was needed to remove any stuck flash or molded goods from the mold surface.

A release rating of 1 was given:

When only some of the parts could be removed in one piece, although with great difficulty even when demolding was assisted with an air gun. The molded parts may or may not have torn when the mold was opened. Everything including runners and flash stuck strongly to the mold surface and was difficult to remove. Rubbing with copper wool or similar was needed to remove any stuck flash or molded goods from the mold surface.

A release rating of 2 was given:

When most of the parts could be removed in one piece, although with great difficulty even when demolding is assisted with an air gun. Everything including runners and flash stuck strongly to the mold surface and was difficult to remove. Rubbing with copper wool or similar was needed to remove any stuck flash or molded goods from the mold surface. Air alone was not enough to demold the stuck parts or flash.

A release rating of 3 was given:

When nearly all parts could be removed in one piece, only with the assistance of an air gun. The runners and some flash could be removed with the air gun but not with out tearing. The remaining flash that stuck to the mold required rubbing with fabric to remove it from the mold. Air alone was not enough.

A release rating of 4 was given:

When all parts could be removed in one piece, only with the assistance of an air gun. The runners could be removed without tearing but not in one piece with the parts, not even when assisted with an air gun. A lot of flash tore and stuck to the mold and required rubbing with fabric to remove it from the mold. Air alone was not enough.

A release rating of 5 was given:

When all parts and runner system could be removed without tearing but only with the assistance of an air gun. Some flash tore and stuck to the mold and required rubbing with fabric to remove it from the mold. Air alone was not enough to remove flash that remained stuck to the mold surface.

A release rating of 6 was given:

When nearly all parts and runner system could be removed without tearing but only with the assistance of an air gun. Flash seldom tore and stuck to the mold. When some flash did stick to the mold, light rubbing or a short blast from the air gun easily removed the flash.

A release rating of 7 was given:

When all shots, parts, runner system and flash could be removed without tearing but only minimal assistance of an air gun was used. Occasional demolding without air and tearing was possible.

A release rating of 8 was given:

When all parts, runners and flash could be consistently removed without tearing and without using air. Demolding by hand and with very low forces was all that was required to removed all parts, runners and flash.

TABLE 7

| Mold Release | |
|---|---|
| Example | Mold Release Rating |
| C2 | 5 |
| 8 | 8 |

Example 9

A sample was prepared according to the procedure set forth in Example 5 except that the fluoropolymer was a copolymer comprising 60 wt. % vinylidene fluoride and 40 wt. % hexafluoropropene with a total fluorine content of 66 wt. %. The copolymer was prepared according to the method described in Example 3 of Grootaert et al., U.S. Pat. No. 5,285,002, hereby incorporated by reference. In addition, 4,4'-(hexafluoroisopropylidene) diphenol (3.0 g, 2.1 mmhr, commercially available as Bisphenol-AF from Aldrich Chemical Co.) in 70 wt. % ethanol solution was used in place of Viton™Curative-30. Injection molding evaluations were carried out and mold release was evaluated and rated in accordance with the rating system described in Example 8 and Comparative Example C2. The mold release rating for the comparison was a 4.

Other embodiments are within the following claims.

What is claimed is:

1. A curable composition comprising:
   (a) at least one curable polymer comprising interpolymerized unit derived from vinylidene fluoride; and
   (b) at least one cure accelerator comprising a silyl-functional onium salt.

2. A composition according to claim 1 comprising a cure accelerator having the formula

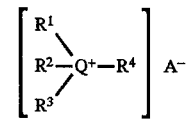

where Q is an onium ion; $A^-$ is a counterion; and $R^1$, $R^2$, $R^3$, and $R^4$, independently, are monovalent substituents in which at least one of said $R^1$, $R^2$, $R^3$, and $R^4$ groups comprises a $C_1$–$C_6$ alkyl group and at least one of said $R^1$, $R^2$, $R^3$, and $R^4$ groups comprises a silyl group, with the proviso that when Q is a sulfonium ion, there is no $R^4$ group.

3. A composition according to claim 2 wherein said silyl group has the formula $-(CH_2)_n-SiR^5R^6-(OSiR^7R^8)_y-Z$ or $-(CH_2)_n-Si-(OSiR^{10}_3)_3$ or

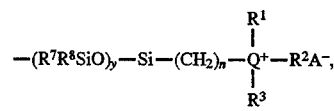

where Z is $-OSiR^9_3$ and each $R^5$, $R^6$, $R^7$, $R^8$, $R^9$, and $R^{10}$, independently, is a $C_1$–$C_6$ alkyl group; n is 2–4; and y is 0–4.

4. A composition according to claim 2 wherein at least one of said $R^1$, $R^2$, $R^3$, and $R^4$ groups is an n-butyl or iso-butyl group.

5. A composition according to claim 2 wherein at least one of said $R^1$, $R^2$, $R^3$, and $R^4$ groups comprises an aryl or alkaryl group.

6. A composition according to claim 1 wherein the onium ion comprises a phosphonium, ammonium, or sulfonium ion.

7. A composition according to claim 1 wherein the onium ion comprises a phosphonium ion.

8. A composition according to claim 1 comprising a cure accelerator having the formula

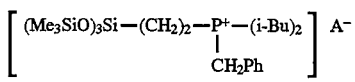

9. A composition according to claim 1 comprising a cure accelerator having the formula

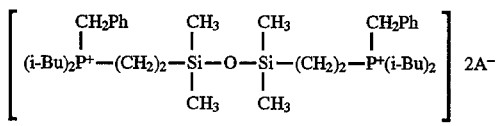

10. A composition according to claim 1 comprising a cure accelerator having the formula

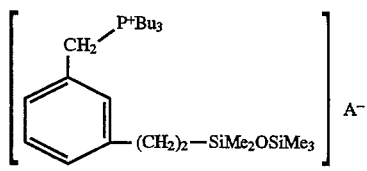

11. A composition according to claim 1 comprising a cure accelerator having the formula

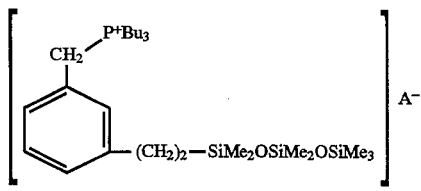

12. A composition according to claim 1 comprising a cure accelerator having the formula

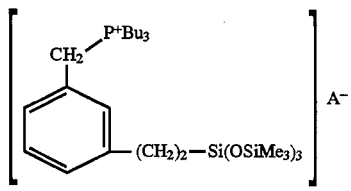

13. A composition according to claim 1 comprising a cure accelerator having the formula

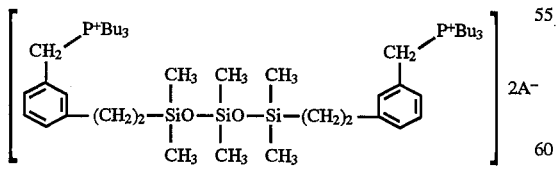

14. A composition according to claim 1 comprising a cure accelerator having the formula

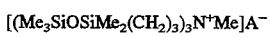

15. A composition according to claim 1 comprising a cure accelerator having the formula

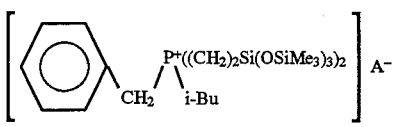

16. A method of curing a polymer comprising interpolymerized units derived from vinylidene fluoride comprising combining said polymer with a cure accelerator comprising a silylated onium salt under reaction conditions sufficient to cure said polymer.

17. A method according to claim 16 comprising using a cure accelerator having the formula

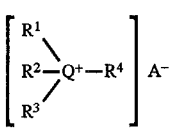

where Q is an onium ion; $A^-$ is a counterion; and $R^1, R^2, R^3$, and $R^4$, independently, are monovalent substituents in which at least one of said $R^1, R^2, R^3$, and $R^4$ groups comprises a $C_1$-$C_6$ alkyl group and at least one of said $R^1, R^2, R^3$, and $R^4$ groups comprises a silyl group, with the proviso that when Q is a sulfonium ion, there is no $R^4$ group.

18. A method according to claim 17 wherein said silyl group has the formula $-(CH_2)_n-SiR^5R^6-(OSiR^7R^8)_y-Z$ or $-(CH_2)_n{-}_{Si-(OSiR^{10}{}_3)_3}$ or where Z is $-OSiR^9{}_3$ and each $R^5, R^6, R^7, R^8, R^9$, and $R^{10}$, independently, is a $C_1$-$C_6$ alkyl group; n is 2–4; and y is 0–4.

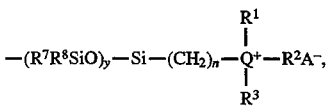

19. A method according to claim 17 wherein at least one of said $R^1, R^2, R^3$, and $R^4$ groups is an n-butyl or iso-butyl group.

20. A method according to claim 17 wherein at least one of said $R^1, R^2, R^3$, and $R^4$ groups comprises an aryl or alkaryl group.

21. A method according to claim 16 wherein the onium ion comprises a phosphonium, ammonium, or sulfonium ion.

22. A method according to claim 16 wherein the onium ion comprises a phosphonium ion.

23. A method according to claim 16 comprising a cure accelerator having the formula

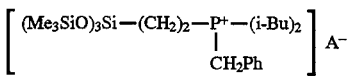

24. A method according to claim 16 comprising a cure accelerator having the formula

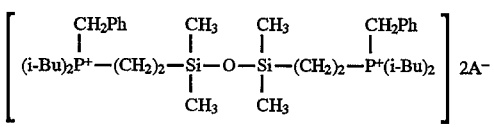

25. A method according to claim 16 comprising a cure accelerator having the formula

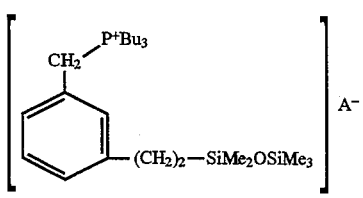

26. A method according to claim 16 comprising a cure accelerator having the formula

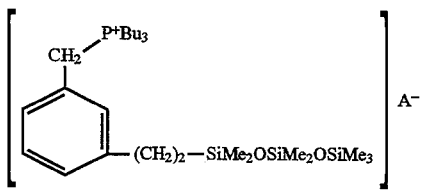

27. A method according to claim 16 comprising a cure accelerator having the formula

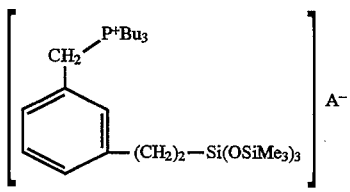

28. A method according to claim 16 comprising a cure accelerator having the formula

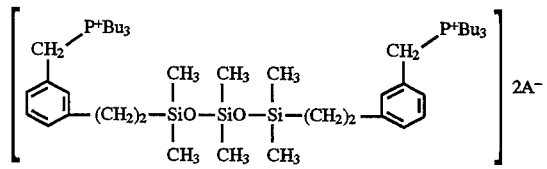

29. A method according to claim 16 comprising a cure accelerator having the formula

[(Me$_3$SiOSiMe$_2$(CH$_2$)$_3$)$_3$N$^+$Me]A$^-$

30. A method according to claim 16 comprising a cure accelerator having the formula

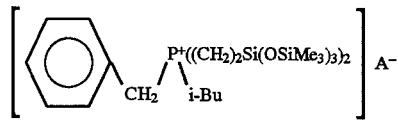

* * * * *

UNITED STATES PATENT AND TRADEMARK OFFICE
CERTIFICATE OF CORRECTION

PATENT NO. : 5,654,374

DATED : August 5, 1997

INVENTOR(S) : Dirk H. C. Arren, William D. Coggio, and Douglas S. Parker

It is certified that error appears in the above-identified patent and that said Letters Patent is hereby corrected as shown below:

Col. 1, line 51, please delete "opium" and insert therefore —onium—.

Col. 5, line 7, please delete the "-" between the words "compounds" and "are".

Col. 6, line 31, please delete "$t_s 50$" and insert therefore —t'50—.

Col. 6, line 38, please delete "1770° C." and insert therefore —177° C.—.

Col. 8, line 52, please delete "β isomer" and insert therefore —α isomer—.

Col. 8, line 52, please delete "62 isomer" and insert therefore —β isomer—.

Col. 9, line 30, please delete "chemical company" and insert therefore —Chemical Company—.

Col. 16, line 29, please delete "-$(CH_2)_{n}$-Si-$(OSiR^{10}{}_3)_3$ and insert therefore — -$(CH_2)_n$-Si-$(OSiR^{10}{}_3)_3$ —.

UNITED STATES PATENT AND TRADEMARK OFFICE
CERTIFICATE OF CORRECTION

PATENT NO. : 5,654,374
DATED : August 5, 1997
INVENTOR(S) : Dirk H. C. Arren, William D. Coggio, and Douglas S. Parker It is certified that error appears in the above-identified patent and that said Letters Patent is hereby corrected as shown below:

Col. 16, line 30, the below formula should be moved to line 30:

$$-(R^7R^8SiO)_y\text{-}Si\text{-}(CH_2)_n\text{-}Q^+\text{-}R^2 \ A^- \ ,$$
with $R^1$ above Si and $R^3$ below Si before the following phrase "where Z is $-OSiR^9{}_3$ and each $R^5$, $R^6$, $R^7$, $R^8$, $R^9$, and $R^{10}$, independently, is a $C_1$-$C_6$ alkyl group; n is 2-4; and y is 0-4."

Signed and Sealed this

Second Day of June, 1998

Attest:

BRUCE LEHMAN

*Attesting Officer*     *Commissioner of Patents and Trademarks*